(No Model.)
F. SCHIFFERLE.
CULINARY VESSEL.
No. 271,745. Patented Feb. 6, 1883.
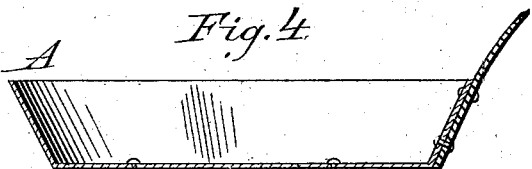
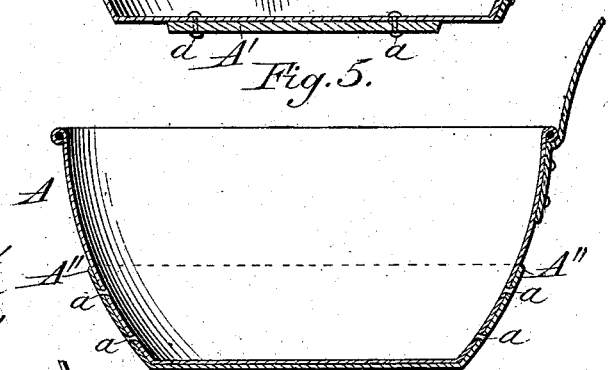
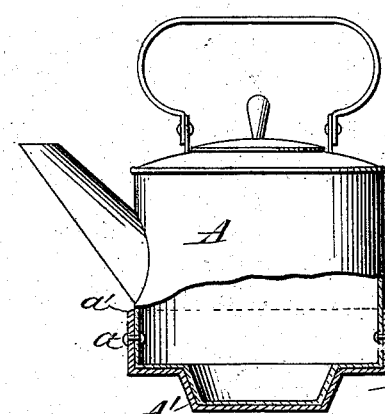
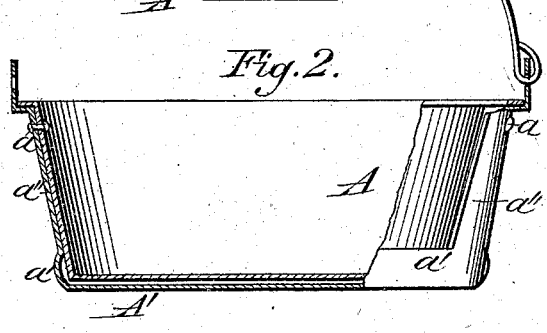
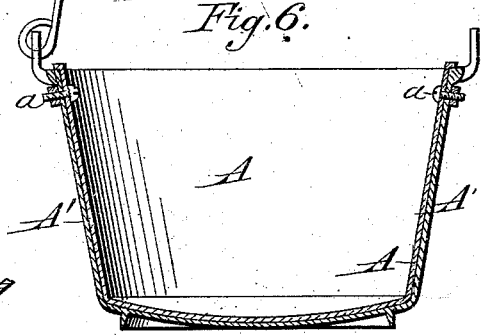
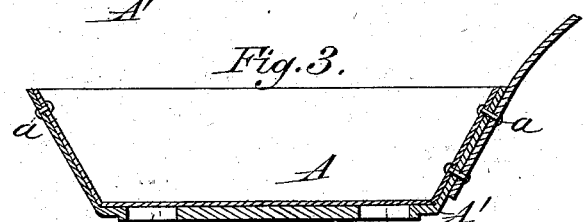
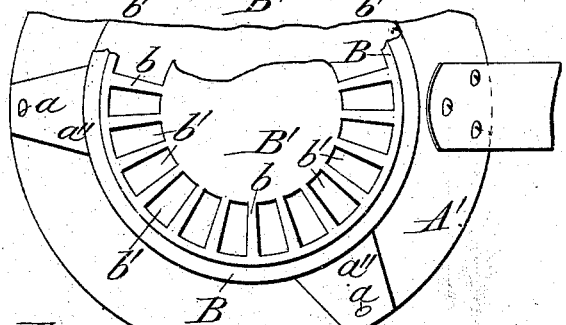
Attest:
F. H. Schott
J. Mason Goszler
Inventor:
Fridolin Schifferle
By N. Cranford
atty.

UNITED STATES PATENT OFFICE.

FRIDOLIN SCHIFFERLE, OF ST. LOUIS, MISSOURI.

CULINARY VESSEL.

SPECIFICATION forming part of Letters Patent No. 271,745, dated February 6, 1883.

Application filed August 10, 1882. (No model.)

*To all whom it may concern:*

Be it known that I, FRIDOLIN SCHIFFERLE, a citizen of the United States, residing at the city of St. Louis, in the county of St. Louis and State of Missouri, have invented certain new and useful Improvements in Culinary Vessels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to improve culinary or kitchen utensils by attaching thereto a removable jacket or protector in such manner that the wear will come upon the protector instead of upon the utensil itself, which in such case can be made of much thinner and lighter materials, and at the same time be durable; and the invention consists in the construction of and the application of the protector to the utensil, as will be fully hereinafter described.

In the drawings, Figure 1 represents a partly-broken side view of a tea-kettle with a protector attached. Fig. 2 represents a part sectional view of a bailed kettle with a protector attached. Fig. 3 represents a sectional view of a frying-pan and a bottom view of its protector. Fig. 4 represents a sectional view of a frying-pan and its protector modified in its application. Fig. 5 represents a sectional view of an enameled saucepan and its protector attached. Fig. 6 represents a sectional view of a brass kettle within a protector and the mode of attaching.

It is well known to all who use culinary vessels, and especially such as are made from thin sheet metal and applied to direct heat, that they are liable to burn out at the point where the heat is most intense; also, that all such vessels are in danger of being damaged by being bruised in handling, and especially so when the metal of which they are constructed is in a heated condition; and my invention of the attaching of protectors to all such vessels will effectually prevent the bruising and very much prolong the usefulness of the vessel itself, and when the vessel itself becomes useless it can easily and quickly be removed from the protector and a new vessel inserted and secured in its place, or, if the protector is broken, burned out, or worn out, it can be removed and a new one can be attached, thus making a thin sheet-metal vessel do service much longer by the use of a protector that costs but a trifle.

The tea-kettle A (shown in Fig. 1) is of the common construction, from sheet-tin, and has the protector A' formed to fit upon and embrace the most exposed parts of the kettle to either heat or blows, which protector, when so fitted, is secured to the body A of the kettle by the rivets $a$ in the flange $a'$ thereof, that pass through the metal of the body of the kettle and flange of the protector.

The protector A' may be formed from sheet-metal or from cast metal, as may be desired.

In Fig. 2 is represented a modification of the same invention; but the protector is constructed and applied to the vessel to cover exposed parts and the bottom completely, and has a narrow flange, $a'$, rising upward on the outside of the vessel high enough to protect the angle thereof where the sides and bottom meet, with upwardly-rising straps $a''$—two or more in number—to or near the top of the vessel; and the rivets $a$ are placed in holes in these straps, and thence pass through the body of the vessel, and are then riveted. If a bail is necessary, (shown in Fig. 2,) the straps $a''$ extend high enough above the rim of the vessel to form bail-ears, into which the bail is secured in the usual way.

In Fig. 3 is represented a frying-pan, the body of which is of sheet-iron, and the bottom of which in use is subjected to a high degree of heat, and the center of the bottom is quickly burned out, and the protector to this is a circular cast grating, B, having a circular center, B', and grate-bars $b$, with openings $b'$ between the grate-bars surrounding the center B'. This protector has two or more straps with the rivets $a$ to hold the protector fast to the body A, the same as in Fig. 3.

In Fig. 4 is represented another frying-pan, having the protector to cover the center of the bottom of the pan, and firmly riveted thereto by the rivets $a$.

In Fig. 5 is represented a saucepan, the body A of which is enameled upon sheet metal, and the protector A' covers the bottom, and has an upturned flange, A'', secured to the body A by the rivets $a$.

In Fig. 6 is represented a kettle, of sheet-brass, the body A being thin and liable to be bruised or indented, and to protect such kettle from being bruised or burned by heat the protector A' is of cast metal, which entirely covers the outside of the kettle, and is firmly attached to the body by the rivets or screw-bolts $a$.

I have described and shown how and in what manner my protector may be applied and secured to vessels of different shapes and for different uses, the gist of my invention being to show the adaptation of the same protector to the many different kinds of vessels in use.

I do not claim simply riveting one part to another part of a vessel, as handles and ears for bails have been so secured; but What I do claim is—

A culinary vessel, A, having a protector, A', secured thereto by rivets $a$ through straps $a''$, and the bottom thereof having concentric open spaces $b'$, and intermediate bars $b$, and a solid center, B', and outer ring, B, as and for the purposes described.

In testimony whereof I affix my signature in presence of two witnesses.

FRIDOLIN SCHIFFERLE.

Witnesses:
J. C. ADAMS,
FRED RAUM.